(12) United States Patent
Kim

(10) Patent No.: US 11,290,860 B2
(45) Date of Patent: Mar. 29, 2022

(54) METHOD FOR PROCESSING REQUEST MESSAGE IN M2M SYSTEM AND DEVICE THEREFOR

(71) Applicant: Samsung Electronics Co., Ltd., Suwon-si (KR)

(72) Inventor: Sang-eon Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 81 days.

(21) Appl. No.: 16/625,635

(22) PCT Filed: Jun. 20, 2018

(86) PCT No.: PCT/KR2018/006944
§ 371 (c)(1),
(2) Date: Dec. 20, 2019

(87) PCT Pub. No.: WO2018/236137
PCT Pub. Date: Dec. 27, 2018

(65) Prior Publication Data
US 2020/0344584 A1    Oct. 29, 2020

(30) Foreign Application Priority Data

Jun. 20, 2017 (KR) .......................... 10-2017-0078225
Jun. 19, 2018 (KR) .......................... 10-2018-0070116

(51) Int. Cl.
*H04B 7/00* (2006.01)
*H04W 4/70* (2018.01)

(52) U.S. Cl.
CPC .................. *H04W 4/70* (2018.02)

(58) Field of Classification Search
CPC ........................................ H04W 4/70
(Continued)

(56) References Cited

U.S. PATENT DOCUMENTS

2016/0019294 A1\* 1/2016 Dong ................. G06F 16/288
707/794
2016/0234691 A1  8/2016 Jeong et al.
(Continued)

FOREIGN PATENT DOCUMENTS

KR   10-2016-0132313 A   11/2016
KR   10-2017-0007691 A    1/2017
WO      2015069038 A1    5/2015

OTHER PUBLICATIONS

PRO-2016-0012-flexBlocking, Change Request, Huawei Technologies Co., Ltd., Jan. 8, 2016.\*
(Continued)

*Primary Examiner* — Mark G. Pannell

(57) ABSTRACT

The present embodiment relates to a machine-to-machine communication (M2M) technique, and to a method for a receiver processing a request message sent by a transmitter, and a device therefor. One embodiment provides a method and a device for an M2M device processing a request message, the method comprising the steps of: receiving, from another M2M device, a request message including response type parameter information; checking the response type parameter information and determining a response mode according to the response type parameter information; and transmitting a response message including a response status code configured so as to be classified according to the determined response mode.

12 Claims, 17 Drawing Sheets

(58) Field of Classification Search
USPC .......................................................... 370/310
See application file for complete search history.

(56) References Cited

U.S. PATENT DOCUMENTS

| | | | |
|---|---|---|---|
| 2017/0099562 A1* | 4/2017 | Bhalla | ..................... H04L 67/16 |
| 2017/0124193 A1* | 5/2017 | Li | ......................... G06F 16/367 |
| 2017/0332421 A1* | 11/2017 | Sternberg | ............ H04W 72/048 |
| 2018/0103337 A1* | 4/2018 | Di Girolamo | .......... H04W 4/70 |
| 2018/0205804 A1 | 7/2018 | Kim | |
| 2018/0270314 A1* | 9/2018 | Mladin | ............... H04L 67/2833 |

OTHER PUBLICATIONS

ISA/KR, International Search Report and Written Opinion of the International Searching Authority, International Application No. PCT/KR2018/006944, dated Sep. 11, 2018, 11 pages.

Korean Intellectual Property Office, "Office Action," Application No. KR10-2018-0070116, dated May 13, 2019, 7 pages.

ETSI TS 118 101 V2.10.0 (Oct. 2016), Technical Specification, oneM2M; Functional Architecture (oneM2M TS-0001 version 2.10.0 Release 2), Oct. 2016, 421 pages.

ONEM2M, "CoAp Protocol Binding," Technical Specification, TS-0008-V-1.6.0, Feb. 23, 2017, 19 pages.

* cited by examiner

FIG. 14

| RESPONSE STATE CODE | INDICATION INFORMATION |
|---|---|
| 1000 | INDICATE NORMAL RECEPTION |
| 1001 | INDICATE NORMAL RECEPTION FOR NONBLOCKINGREQUESTSYNCH MODE |
| 1002 | INDICATE NORMAL RECEPTION FOR NONBLOCKINGREQUESTASYNCH MODE |

METHOD FOR PROCESSING REQUEST MESSAGE IN M2M SYSTEM AND DEVICE THEREFOR

CROSS-REFERENCE TO RELATED APPLICATIONS

This application is a 371 National Stage of International Application No. PCT/KR2018/006944, filed Jun. 20, 2018, which claims priority to Korean Patent Application No. 10-2017-0078225, filed Jun. 20, 2017, and Korean Patent Application No. 10-2018-0070116 filed on Jun. 19, 2018, the disclosures of which are herein incorporated by reference in their entirety.

BACKGROUND

1. Field

The disclosure relates to a machine to machine communication (M2M) technology, and more particularly, to a method and an apparatus for processing a request message, which an originator transmits, by a receiver.

2. Description of Related Art

Communication of things (machine to machine communication (M2M), machine type communication (MTC), smart device communication, machine oriented communication, or Internet of Things) refers to all types of communication schemes in which communication is performed without intervention of a person in a communication process.

In general, M2M does not directly communicate with a person and does not perform application control, and thus needs a transmission/reception method and procedure in order to exchange messages between objects. Further, for smooth message exchange between M2M devices, a protocol is needed.

Particularly, according to popularization of IoT devices, a plurality of M2M devices are used within homes and offices, and the M2M devices perform the same or similar functions for a predetermined purpose.

In such a situation, the plurality of M2M devices may have different functions and a message processing capability, and the difference therebetween may be an obstacle of M2M. For example, even though a specific M2M device makes a request for processing a message in a specific type to another M2M device having the message processing capability, a processing procedure for the corresponding type may not be configured in the M2M device receiving the request message.

Accordingly, a unified protocol for smoothly processing a message between M2M devices included in an M2M system is required, and a detailed technology for processing a message between M2M devices configured to have different processing functions while preventing an error therebetween is needed.

SUMMARY

An embodiment made under the above-described background proposes a detailed method and apparatus in which, if an M2M device receives a request message from another M2M device, the M2M device provides information on a mode for processing the corresponding request message to the other M2M device.

Further, an embodiment proposes a detailed method and apparatus for smoothly transmitting a response message of a request message by transmitting information on a response mode selected by an M2M device for the request message configured as a flex blocking response type parameter to an originator without any additional system load.

In accordance with an aspect of the disclosure, a method of processing a request message by a machine-to-machine communication (M2M) device is provided. The method includes: receiving a request message including response type parameter information from another M2M device; identifying the response type parameter information and determining a response mode according to the response type parameter information; and transmitting a response message including a response state code configured according to the determined response mode.

In accordance with another aspect of the disclosure, a machine-to-machine communication (M2M) device for processing a request message is provided. The M2M device includes: a reception unit configured to receive a request message including response type parameter information from another M2M device; a controller configured to identify the response type parameter information and determine a response mode according to the response type parameter information; and a transmission unit configured to transmit a response message including a response state code configured according to the determined response mode.

The disclosure provides an effect of smooth data transmission and reception between M2M devices that support different response modes as, if an M2M device receives a request message from another M2M device, the M2M device provides information on a mode for processing the corresponding request message to the other M2M device.

BRIEF DESCRIPTION OF THE DRAWINGS

FIG. 14 illustrates a response state code according to an embodiment;

DETAILED DESCRIPTION

Figure 1:
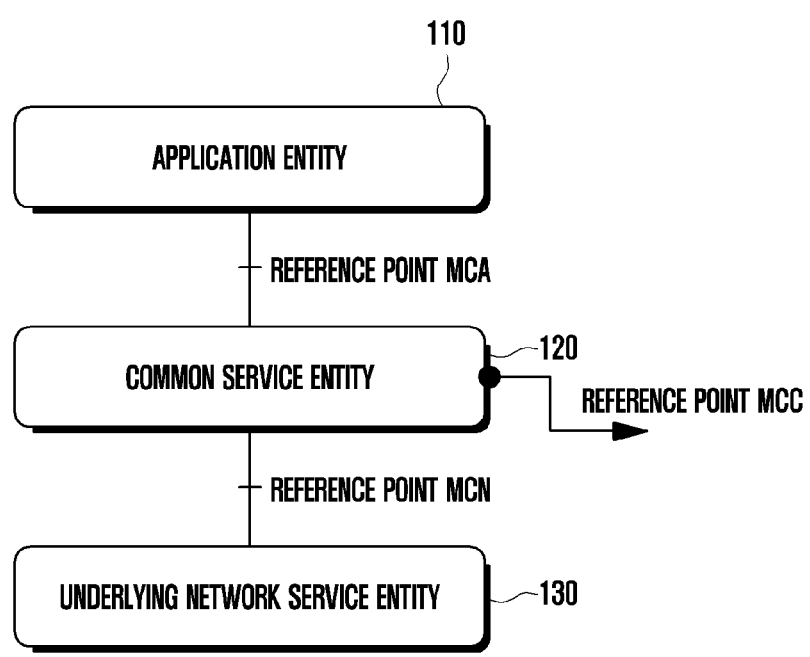
FIG. 1 illustrates an M2M system in a functional aspect of a higher level.

Hereinafter, exemplary embodiments of the disclosure will be described with reference to the accompanying drawings. In adding reference numerals to elements in each drawing, the same elements will be designated by the same reference numerals, if possible, although they are shown in different drawings. Further, in the following description of the disclosure, a detailed description of known functions and configurations incorporated herein will be omitted when it is determined that the description may make the subject matter of the disclosure rather unclear.

In addition, terms, such as first, second, A, B, (a), (b) or the like may be used herein when describing components of the disclosure. These terms are merely used to distinguish one structural element from other structural elements, and a property, an order, a sequence and the like of a corresponding structural element are not limited by the term. If a component is described as 'connected', 'coupled', or 'linked' to another component, one of ordinary skill in the art would understand the components are not necessarily directly 'connected', 'coupled', or 'linked' but also are indirectly 'connected', 'coupled', or 'linked' via a third component.

Embodiments of the disclosure are described mainly based on communication of things. The communication of things may be called various terms such as machine to machine communication (M2M), machine type communication (MTC), Internet of things (IoT), smart device communication (SDC), and machine-oriented communication. Recently, one M2M presents many technical matters related to M2M communication. M2M communication refers to various communication performed without intervention of a person in a communication process. M2M communication is divided into an energy field, an enterprise field, a healthcare field, a public service field, a residential field, a retail field, a transportation field, and other fields. The disclosure includes the fields and can be applied to other fields.

FIG. 1 illustrates an M2M system according to an embodiment in a functional aspect of a higher level.

An application entity (AE) 110 provides an application service logic for end-to-end M2M solutions. For example, the application service logic includes a fleet tracking application for vehicles, a remote blood sugar monitoring application, or a remote power metering and controlling application.

A common service entity (CSE) 120 provides a collective service function required in common for an energy field, an enterprise field, a healthcare field, a public service field, a residential field, a retail field, a transportation field, and other fields.

The service function may become different functions through reference points such as Mca and Mcc, and uses an underlying network service based on the reference point Mcn. For example, the common service entity may be data management, device management, M2M subscription management, and a location service. A subfunction provided by the CSE may be logically understood as a common service function (CSF). Some of the CSFs within the CSE of a one M2M node may be mandatory and some may be optional. Similarly, subfunctions within the CSFs may be also mandatory or optional.

An underlying network service function (NSF) 130 provides services to the common service entity. For example, the services include device management, location services, and device triggering.

Reference points are supported by the common service entity (CSE), and the reference point Mca indicates a reference point for providing M2M between an application entity and a common service entity. The reference point Mcc is a reference point for providing M2M between two common service entities. The reference point Mcn is a reference point for providing M2M between a common service entity and one network service entity.

More specifically, the reference point Mca allows one application entity (AE) to use the services supported by the common service entity. The services provided through the reference point Mca may be dependent on the functions provided by the communication service entity, and the application entity and the common service entity may exist in the same physical entity or separately exist in different physical entities. The reference point Mcc allows a common service entity that desires to use a service of another common service entity that provides a required function to use the service. The services provided through the reference point Mcc are dependent on the functions provided by the common service entity. The reference point Mcc may be supported between different M2M nodes. The reference point Mcn allows a common service entity that desires to use an underlying network service entity that provides a required function to use it, and provides services other than transport and connectivity. An instance of the reference point Mcn is implemented to be dependent on the services provided by the underlying network. Information exchange between two physical M2M nodes may use underlying network transport and connectivity services that provide basic services.

In the specification, the common service entity may be described as the CSE and the network service entity may be described as the network service entity (NSE). Further, in the specification, the M2M device may be a CSE, an AE, a device including a CSE or an AE, or a device or a terminal included in the M2M system.

Figure 2:
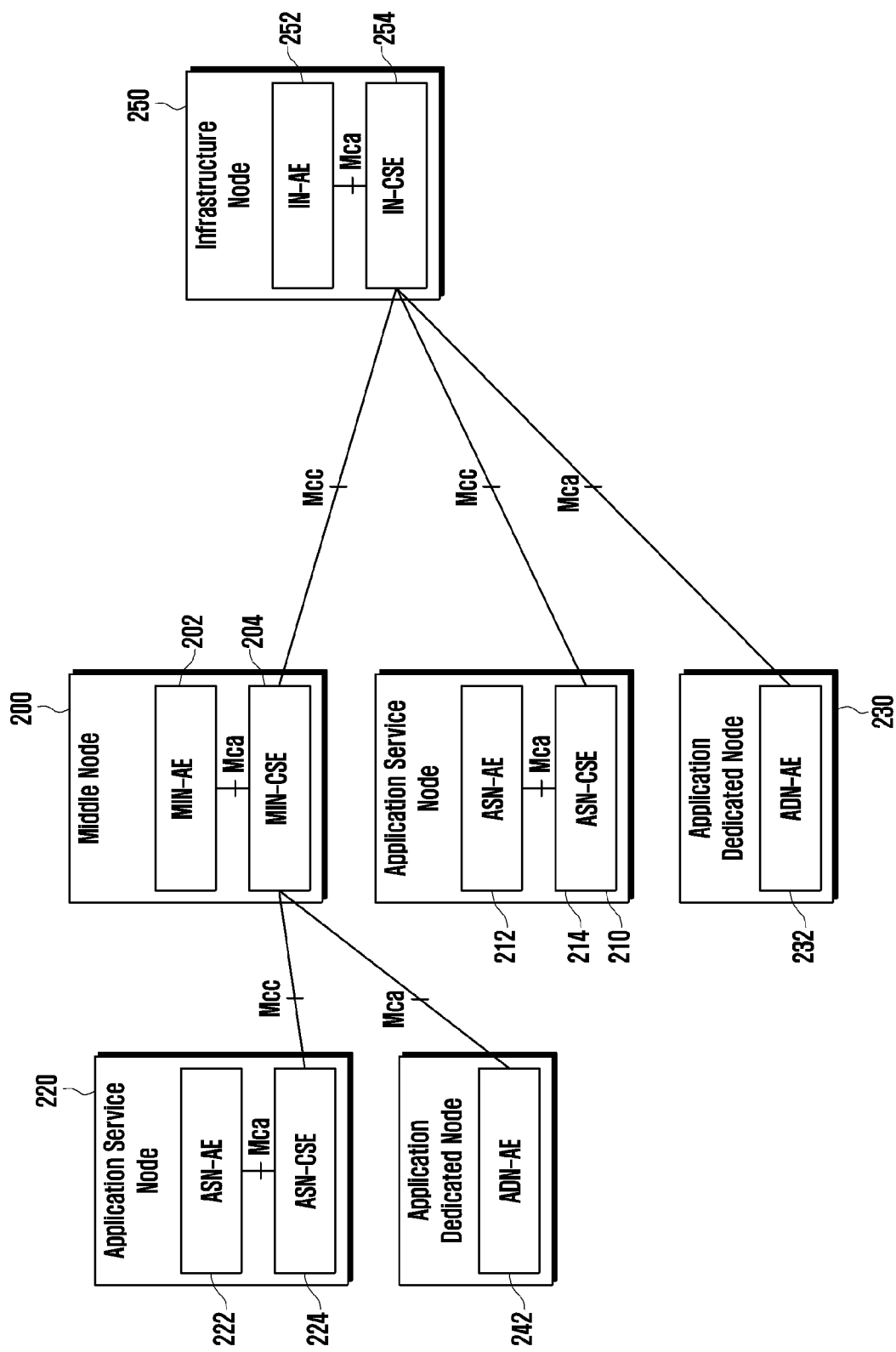
FIG. 2 illustrates a configuration of the M2M system according to an embodiment in more detail.

FIG. 2 illustrates a configuration of the M2M system according to an embodiment in more detail.

Referring to FIG. 2, an infrastructure node 250 performs a server function necessary for providing M2M. The infrastructure node 250 includes an infrastructure node application entity (AE) 252 and an infrastructure node common service entity (CSE) 254. The infrastructure node common service entity 254 is configured using various resources. The infrastructure node application entity 252 and the infrastructure node common service entity 254 are distinguished through the reference point Mca, and are used to configure and process a request message and a response message for creating, deleting, updating, retrieving, or notifying a message required for M2M, particularly, scheduler resources.

A middle node 200 relays functions of M2M, Internet of Things, or communication of things between the application service node 220 and the infrastructure node 250. The middle node 200 includes a middle node application entity 202 and a middle node common service entity 204. The middle node common service entity 204 is configured using various resources. The middle node application entity 202 and the middle node common service entity 204 are distinguished through the reference point Mcc, and are used to configure and process a request message and a response message for creating, deleting, updating, retrieving, or notifying a message required for M2M, particularly, scheduler resources.

An application service node 210 may include an application entity 212 and a middle node common service entity 214. The application entity 212 processes an application function required for a purpose of the device. The common service entity 214 of the application service node 210 is configured using various resources. The application entity 212 and the common service entity 214 are distinguished through the reference point Mcc, and are used to configure and process a request message and a response message for creating, deleting, updating, retrieving, or notifying a message required for M2M, particularly, scheduler resources. Meanwhile, the application service node 220 may perform the M2M function with the infrastructure node 250 via the middle node 200. A difference between the application service node 210 and the application service node 220 is a communication interface configuring the node. For example, the application service node 220 communicates with reference numeral 100 using an interface capable of performing super near-field communication such as Bluetooth, ZigBee, Zwave, and Wi-Fi via the middle node 200. On the other hand, the application service node 210 communicates with the infrastructure node 250 using a communication interface such as 3G, LTE, 5G, Ethernet, Gigabit Ethernet, and ADSL.

Application-dedicated nodes 230 and 240 have no common service entity, but have only an application entity 242 for M2M. The application-dedicated node 230 communicates with the infrastructure node 250 using a communication interface such as 3G, LTE, Ethernet, Gigabit Ethernet, and ADSL, and the application-dedicated node 240 communicates with the middle node 200 using an interface capable of performing super near-field communication such as Bluetooth, ZigBee, Zwave, and Wi-Fi.

As illustrated in FIG. 2, the M2M system may include one or more of the infrastructure node, the middle node, the application service node, and the application-dedicated node, and each node may include the CSE or the AE. Each of the CSE and the AE may communicate with another CSE or AE through a reference point.

Figure 3:
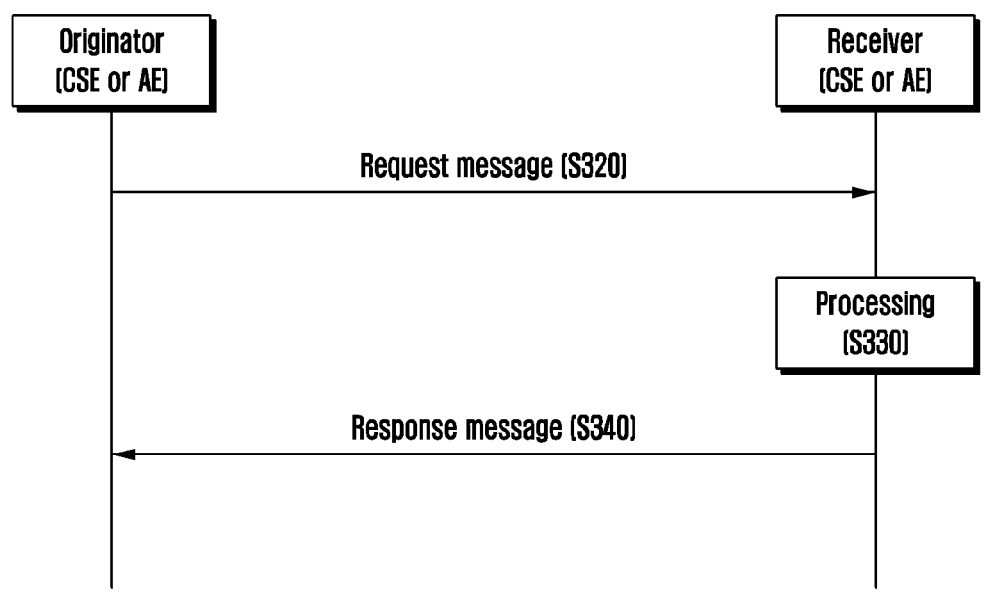
FIG. 3 illustrates a procedure of transmitting a request message and receiving a response message in response thereto in the M2M system.

Referring to FIG. 3, an originator 300 transmits a request message to a receiver 310 in S320. Each of the originator 300 and the receiver 310 may be an M2M device, or the CSE or the AE as described above. Further, each of the originator 300 and the receiver 310 may be a node, a server, or a device including the CSE or the AE.

The request message may include one or more parameters. For example, the request message may include a necessary parameter and a selective parameter. For example, a transmitting side parameter (From), a receiving side parameter (To), a request identifier information parameter (Request Identifier), and an operation parameter (Operation) are necessary parameters. The parameter From includes information on an originator who transmits a message, and the parameter To includes information on a receiver who receives a message. The parameter Request Identifier includes unique identification information for identifying a corresponding request message. The parameter Operation includes information for identifying an operation requested by a request message. The operation parameter may be configured as one of Create, Retrieve, Update, Delete, and Notify. Further, the selective parameter may be added to control various operations of the request message. For example, a selective parameter of a response type may designate a processing scheme of the receiver to a blocking (blockingRequest) scheme, a synchronous non-blocking (nonBlockingRequestSynch) scheme, asynchronous non-blocking (nonBlockingRequestAsynch) scheme, or a receiver-customized (flexBlocking) scheme.

Upon receiving the request message, the receiver 310 performs an operation for processing the corresponding request message in S330. For example, the receiver 310 may identify whether the originator 300 transmitting the request message has a right for the corresponding request. If it is determined that the originator 300 has the right for the request, the receiver 310 processes the request message after identifying whether there is a requested resource which is a target to be requested. Alternatively, the receiver 310 may perform a corresponding operation according to the operation parameter of the request message. For example, if a subscription function indicating, when the operation parameter is configured as "create" and change, addition, or deletion of specific data is generated, provision of the same to the originator 300 is configured, the receiver 310 may generate subscription information. If data corresponding to the corresponding subscription information has a change, addition, or deletion event, the receiver 310 may inform the originator 300 of the event.

The receiver 310 generates processing result information according to the request operation, inserts the generated processing result information into a response message, and transmits the response message to the originator 300 in S340. Step S340 may be performed before step S330. That is, upon receiving the request message, the receiver 310 may generate an ACK response message simply indicating reception of the request message, transmit the ACK response message to the originator 300, and then perform step S330 to process the request message.

Figure 4:
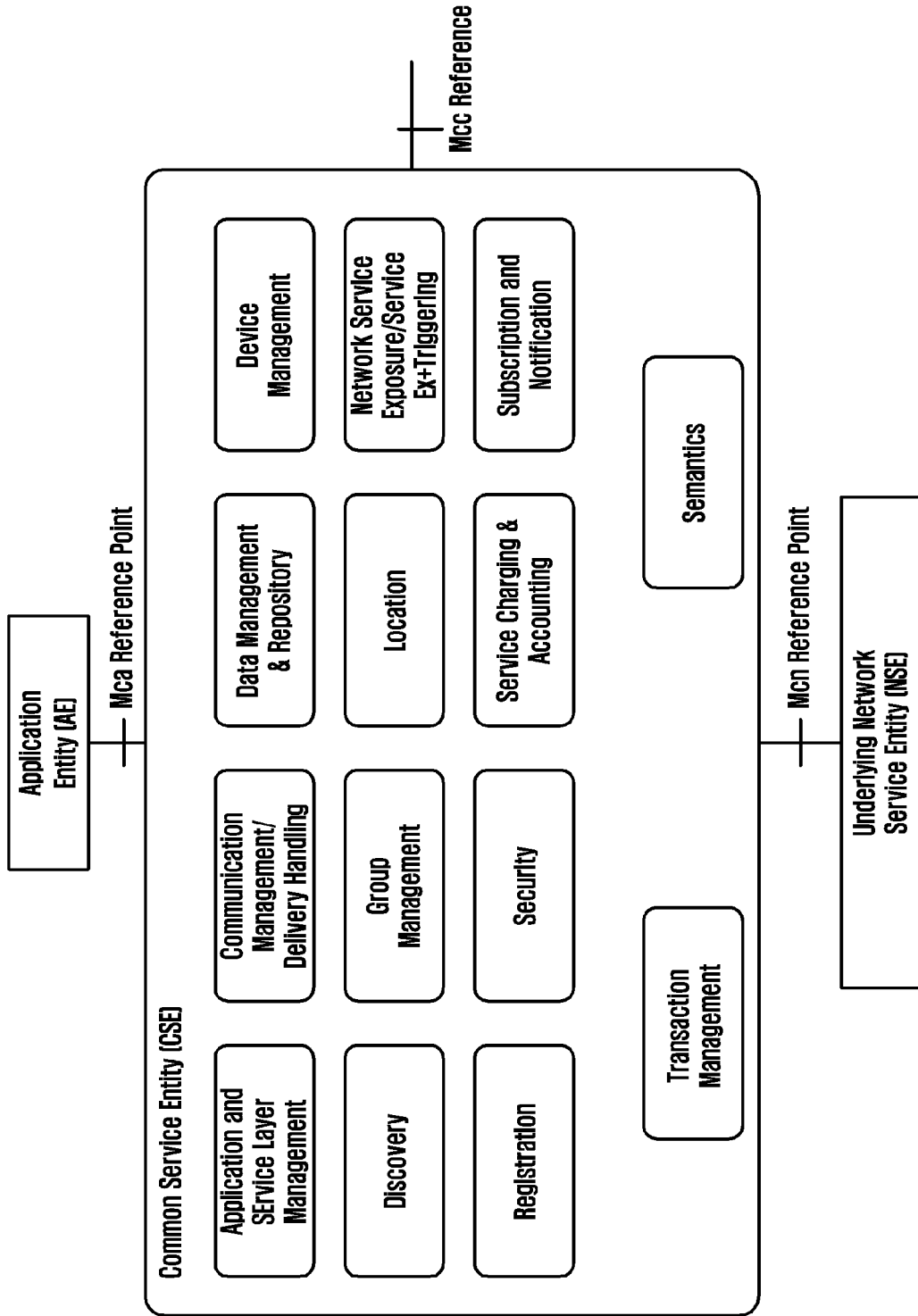
FIG. 4 illustrates a functional structure of a common service entity according to an embodiment.

FIG. 4 is a block diagram illustrating a common service entity according to an embodiment of the disclosure. The common service entity in FIG. 4 includes a function of processing identification information.

As illustrated in FIG. 4, functions provided by the common service entity include addressing & identification, application and service layer management, data management & repository, location, security, communication management/delivery handling, registration, service session management, device management, subscription/notification, connectivity management, discovery, service charging/accounting, network service exposure/service execution and triggering, and group management.

Of course, the functions may include semantics, data analytics, application enablement, and network service function management as well as the above functions.

Each of the functions is described below.

Application and service layer management (ASM) serves to manage the AE and the CSE of the ADN, ASN, MN, and IN and includes a configuration of the CSE, troubleshooting, an upgrade function, and an upgrade of the AE.

Communication management and delivery handling (CMDH) takes responsibility for communication between different CSEs, AEs and NSEs. The CMDH is responsible for determining at which time and using which communication connection the communication will be transferred, determining when the communication (communication between CSEs) is needed and allowed, and storing a communication request when the transfer of communication is delayed until later. The CMDH is performed according to a provisioned policy specified for each request for communication and a delivery handling parameter. In communication using the underlying network data transmission service, the underlying network may support the same delivery handling function. In this case, the CMDH may use the underlying network, and operate as a front end of the underlying network to access the same delivery handling function.

Data management and repository (DMR) may allow an M2M application to exchange data with another entity. A DMR CSF provides a data storage space and provides a function for controlling the same. Further, the DMR CSF includes a function of collecting and combining a large amount of data, changing the data into a particular format, or analyzing and storing the data for semantic processing. "Data" may refer to raw data transparently extracted from the M2M device or processed data calculated or combined by the M2M entity. The collection of a large amount of data is known as a big data storage function.

A DMG (Device Management) CSF serves to manage device functions of devices in an MN, a device node, and an M2M area network. Devices that provide one or more following functions can be managed. The functions include installation and settings of application software, configuration settings and provisioning, firmware update, logging, monitoring, analysis, management of topology of an area network, and devices within management of the area network.

A discovery (DIS) CSF serves to search for information and resources corresponding to a right (including permission in M2M service subscription) permitted within a given range and subject and a request from the originator within a given range. The originator may be an application or another CSE. The range of the search may be one CSE or a plurality of CSEs. A discovery result returns to the originator.

Group management (GMG) handles a group associated with the request. The request is transmitted to manage the group and membership of the group and also serves as a bulk operation supported by the group. If a member is added to or deleted from the group, it may be needed to identify whether the member accords with the purpose of the group. The bulk operation includes read, write, subscribe, inform, and device management. Requests and subscriptions are performed through the group, and the group serves to combine the requests and notifications. Members of the group play the same role in regards to a right to access resources. In this case, an access control is performed by the group. If the underlying network provides a broadcasting function and a multicasting function, the GMG CSF should use such functions.

A LOC (Location) CSF allows an M2M AE to acquire geographical location information of an M2M node (for example, ASN or MN) for a location-based service. A request for the location information may be made from M2M AEs existing within the same or different M2M nodes.

A network service exposure (NSE) CSF manages communication with the underlying network to access a network service function through a Mcn reference point through an available or supportable scheme for a service request from an M2M system instead of an M2M application. The NSE CSF conceals another CSF and an AF from a particular technology and mechanism supported by the underlying network. Network service functions provided from the underlying network include device triggering, small data transmission, location notification, policy rule settings, location inquiry, IMS service, and device management, but are not limited thereto. The functions do not include a general transmission service.

Registration (REG) serves to handle registration of an application or another CSE in the CSE, and allows an entity which desires to use a service provided by the CSE to be registered. The REG CSF handles registration of device characteristics/attributes as well as registration of the device in the CSE.

Security (SEC) provides a data handling (sensitive) function requiring attention, a security operation function, a security combination setting function, an authorization and access control function, and an identification protection function. The sensitive data handling function provided by the SEC CSF provides a function of protecting a local credential that is required to be secured in a storage and control process. The sensitive data handling function also uses a security algorithm. The function supports a security environment in which various encryption schemes are separated. The security operation function provides the following functions. First, the security operation function provides a function of generating and operating a security environment dedicated to be supported by the sensitive data handling function. Further, the security operation function supports post provisioning of a root credential protected in the security environment, and also supports provisioning and operation of subscription related to an M2M service and an M2M application service. The security combination setting function enables confidentiality, integrity, authentication, and authorization by setting a security combination between M2M nodes. The authorization and access control function controls a service and data access to an authorized entity according to a provisioned security policy and an assigned rule. A unique identifier of the entity may be used for the authorization, and the identification protection function may provide anonymity to function as a temporary identifier to be not linked with actual identification information combined with the entity or user.

Service charging and accounting (SCA) provides a charging function of a service layer. The SCA supports different charging models including online charging and offline charging. The SCA CSF guarantees an event to be charged, stores information, and generates charging records and charging information. The SCA CSF may interact with a charging system of the underlying network. However, the SCA CSF has responsibility for generating and recording charging information of a final service level. The SCA CSF of an underlying node or a service layer charging server has responsibility for handling charging information for the charging.

Service session management (SSM) CSF manages an M2M service session corresponding to an end-to-end service layer connection. The SSM CSF manages an M2M service session between M2M applications, between an M2M application and a CSE, or between CSEs. The management of the M2M service session includes management of a session state, session authentication and establishment, a connection of an underlying network related to the session and service management, control of session extension of a CSE corresponding to a multi-hop of the CSE, exchange of information between session ends, and end of the session. Within the given M2M service session, the SSM CSF uses CMDH CSF within a local CSE for message transmission/reception from a next hop CSE or an application. The SSM CSF uses an SEC CSF to manage a session related to a security credential and authentication of a session participant. The SSM CSF generates a charging event specified for a session and communicates with SCA CSF within the local CSE.

Subscription and notification (SUB) provides a notification to maintain subscription and tracks a change in resources (for example, deletion of resources). The subscription of resources is started by the M2M AE or CSE, and an access right thereof is granted by the hosting CSE. If the subscribed resources are changed during the activated subscription, the hosting CSE transmits a notification to an address at which a resource subscriber desires to receive the notification.

FIG. 4 and the description thereof are embodiments for implementing the common service entity, and the disclosure is not limited thereto.

Meanwhile, identifiers which can be applied to the embodiments are described below. M2M identifiers include an M2M service provider identifier (M2M-SP-ID), an application instance identifier (App-Inst-ID), an application identifier (App-ID), a CSE identifier (CSE-ID), an M2M node identifier/device identifier (M2M-Node-ID), an M2M service subscription identifier (M2M-Sub-ID), and a request identifier (M2M-Request-ID).

oneM2M presents overall system requirements, management requirements, data model and semantics requirements, security requirements, charging requirements, and operational requirements as requirements to be met to implement the system.

In the specification, the description is made on the basis of an M2M system technology, particularly, a oneM2M service platform technology. However, the description is not limited to the M2M service platform technology, and can be applied to all systems and structures for providing device-to-device communication, that is, M2M, and a communication operation performed in the systems.

The originator or the transmitter in the specification may be an M2M device that transmits a message, and the receiver or the hosting CSE may be an M2M device that receives a message. However, the receiver may also transmit a response message, and the originator may also receive a response message. Accordingly, an M2M device that initially transmits a request message in a specific procedure is described as the originator or the transmitter, and an M2M device that receives a transmitted request message is described as the receiver or the hosting CSE. Of course, both the originator and the receiver may transmit and receive message as described above.

Further, an M2M device in the specification is described to have a name indicating various nodes including the AE, the CSE, and the NSE, and for convenience of understanding, the description is made on the basis of the hosting CSE but is not limited thereto. That is, the M2M device is one element device included in the M2M system and includes various nodes, devices, and entities that receive a request message, process the request message, and transmit a response message.

The originator may transmit a request message for making a request for a specific operation to the receiver. As illustrated in FIG. 3, when transmitting the request message, the originator may insert the necessary parameter and the selective parameter into the request message. For example, a transmitting side parameter, a receiving side parameter, an operation parameter, and a request identification parameter are necessarily included. Further, a response type parameter may be selectively included.

That is, a reception side M2M device may receive a request message including a response type parameter configured as one of four values shown in [Table 1] below.

TABLE 1

| Response type parameter value | Indication response type |
|---|---|
| 1 | nonBlockingRequestSynch |
| 2 | nonBlockingRequestAsynch |

TABLE 1-continued

| Response type parameter value | Indication response type |
|---|---|
| 3 | blockingRequest |
| 4 | flexBlocking |

In addition, the request message may include content information as necessary.

Upon receiving the request message, the receiving side M2M device identifies whether there is a response type parameter of the request message. If there is no response type parameter, a response mode of the corresponding request message may be determined as a blocking mode.

On the other hand, if there is a response type parameter in the request message, the receiving side M2M device may transmit a response message to the originator according to the corresponding response type parameter value. For example, the response message may include a response state code parameter and a request identification parameter. The request identification parameter has the same value as the request identification parameter of the request message and may indicate a response message in response to the request message.

Specifically, the response state code may be configured as shown in [Table 2] below. For example, if the request message includes the response type parameter and the response type parameter value is synchronous non-blocking (nonBlockingRequestSynch) or asynchronous non-blocking (nonBlockingRequestAsynch), the M2M device may transmit a response message including the response state code of [Table 2] below in order to inform the originator that the corresponding request message is normally received and processed before completing the operation of processing the corresponding request message. One response state code value is shown.

TABLE 2

| Response state code | Indication information |
|---|---|
| 1000 | ACCEPTED |

Hereinafter, a procedure of processing the operation of the originator and the receiver according to the operation parameter of the request message will be described in more detail with reference to the drawings. The following drawings assume successful processing of the receiving side. If processing of the receiving side is failed, a response message including an error code indicating processing failure may be transmitted. Further, the above-described necessary parameters may be omitted hereinafter as necessary. However, the necessary parameters are omitted for convenience of understanding but are necessarily included in the request message or the response message.

FIGS. 5 to 9 illustrate the operation of processing a request parameter-specific request message when the response type parameter of the request message is configured as the blocking mode according to an embodiment.

It is assumed that the request message in FIGS. 5 to 9 below does not include the response type parameter or includes a value indicating the blocking mode. That is, the receiver processes the message in a blocking mode scheme.

Figure 5:
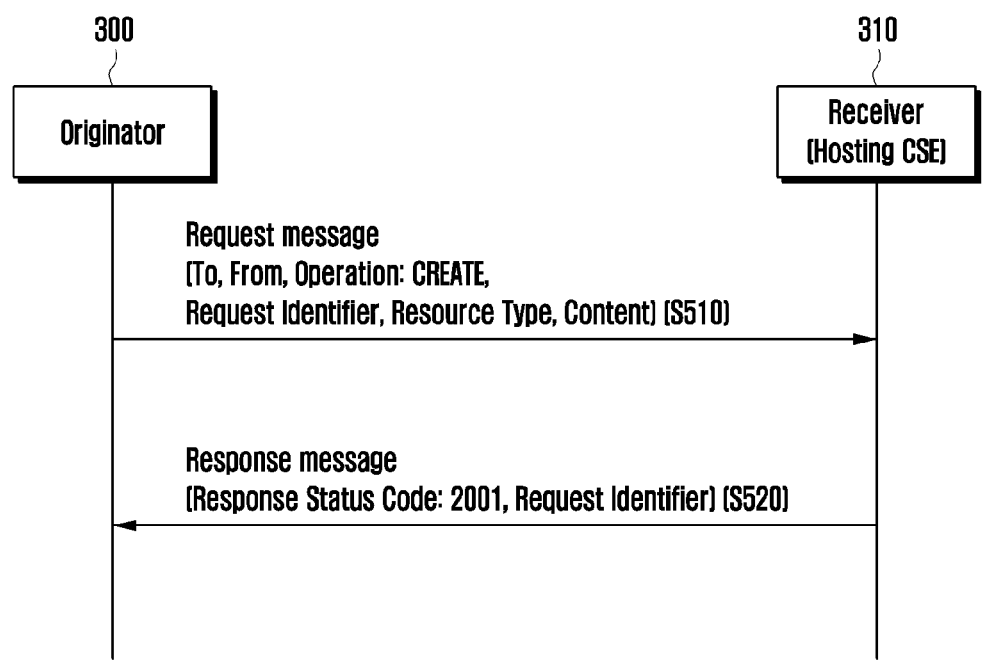
FIGS. 5 to 9 illustrate the operation of processing a request parameter-specific request message when the response type parameter of the request message is configured as the blocking mode according to an embodiment.

Referring to FIG. 5, the originator 300 may transmit a request message for making a request for creating resources by the blocking (blockingRequest) mode in S510. For example, the request message may necessarily include the above-described operation parameter, receiving side parameter, transmitting side parameter, and request identification parameter, and further include a resource type parameter of the resources to be created and content information. The operation parameter is configured as a value indicating creating.

Upon receiving the request message, the receiver 310 creates resources by performing an operation of the requested operation parameter and transmits a response message including a response state code parameter indicating the result and the request identification parameter to the originator 300 in S520. The request identification parameter of the response message may be configured as a value which is the same as the request identification parameter of the request message.

Further, if processing by the creating request is successful, the receiver 310 may configure a value (for example, 2001) of the response state code indicating the success, insert the value into the response message, and transmit the response message.

Figure 6:
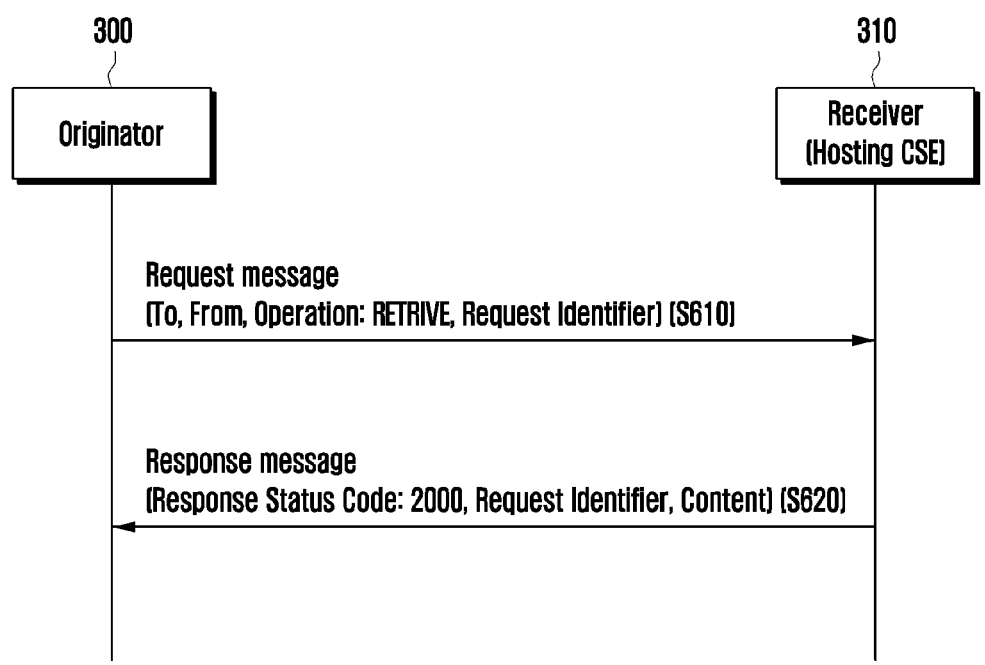

Referring to FIG. 6, the originator 300 may transmit a request message for making a request for retrieving resources by the blocking (blockingRequest) mode in S610. For example, the request message may necessarily include the above-described operation parameter, receiving side parameter, transmitting side parameter, and request identification parameter. The operation parameter is configured as a value indicating retrieving.

Upon receiving the request message, the receiver 310 performs the retrieving operation through the operation of the requested operation parameter, and transmits a response message including a response state code parameter indicating the result and the request identification parameter to the originator 300 in S620. The request identification parameter of the request message may be configured as a value which is the same as the request identification parameter of the request message.

Further, if processing by the retrieving request is successful, the receiver 310 may configure a value (for example, 2000) of the response state code indicating the success, insert the value into the response message, and transmit the response message.

Figure 7:
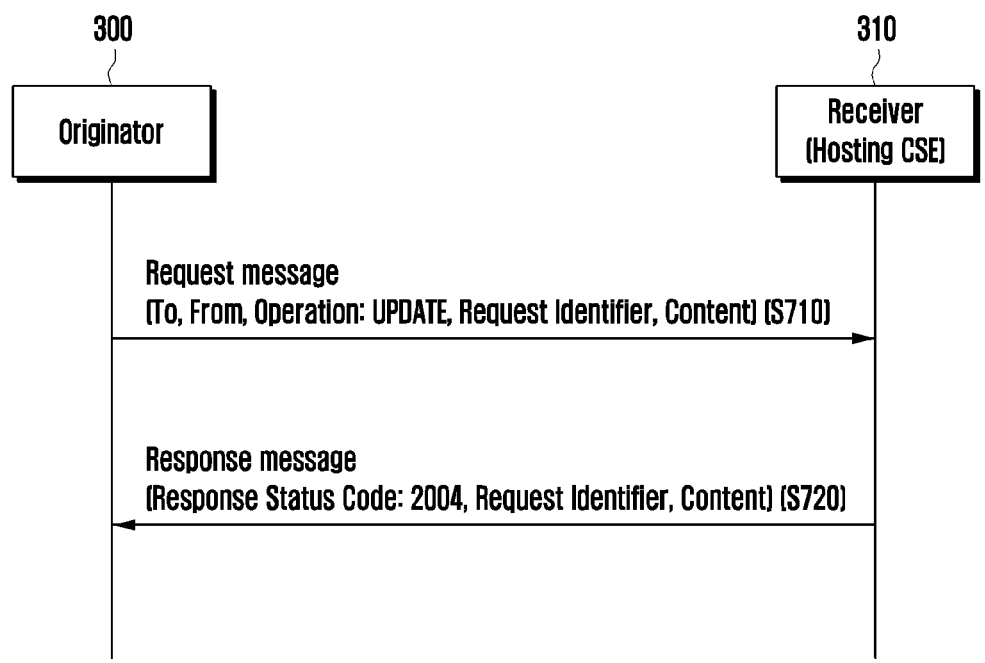

Referring to FIG. 7, the originator 300 may transmit a request message for making a request for updating resources by the blocking (blockingRequest) mode in S710. For example, the request message may necessarily include the above-described operation parameter, receiving side parameter, transmitting side parameter, and request identification parameter, and further include content information. The operation parameter is configured as a value indicating updating.

Upon receiving the request message, the receiver 310 performs the update operation through the operation of the requested operation parameter and transmits a response message including a response state code parameter indicating the result, the request identification parameter, and content information to the originator 300 in S720. The request identification parameter of the request message may be configured as a value which is the same as the request identification parameter of the request message.

If processing by the update request is successful, the receiver 310 may configure a value (for example, 2004) of the response state code indicating the success, insert the value into the response message, insert information on updated resources into content information, and transmit the response message.

Figure 8:
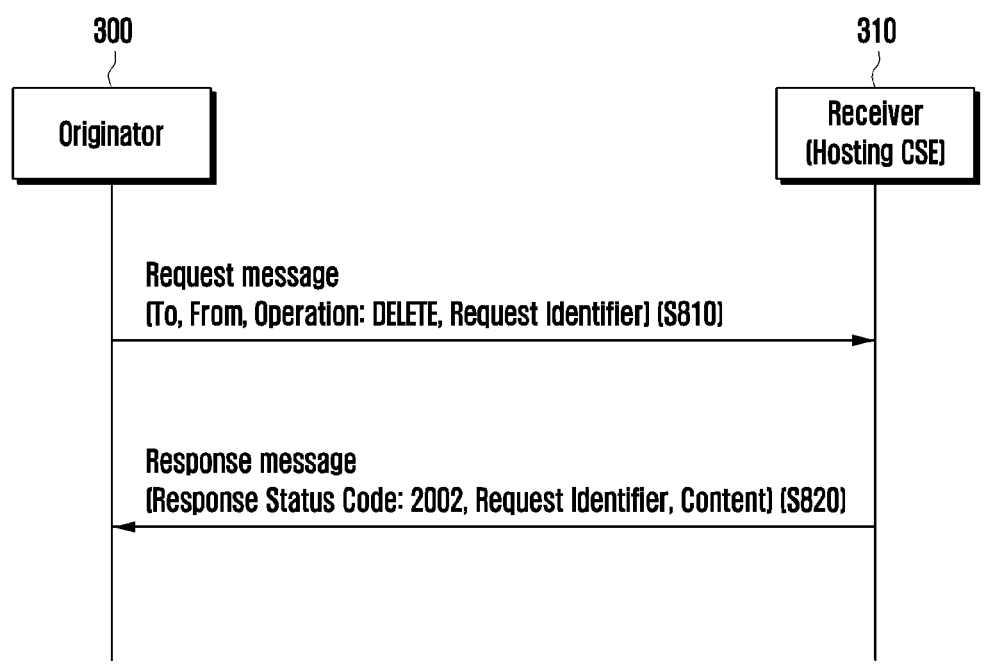

Referring to FIG. 8, the originator 300 may transmit a request message for making a request for deleting resources by the blocking (blockingRequest) mode in S810. For example, the request message may necessarily include the above-described operation parameter, receiving side parameter, transmitting side parameter, and request identification parameter. The operation parameter is configured as a value indicating deleting.

Upon receiving the request message, the receiver 310 deletes resources through the operation of the requested operation parameter and transmits a response message including a response state code parameter indicating the result, the request identification parameter, and content information to the originator 300 in S820. The request identification parameter of the request message may be configured as a value which is the same as the request identification parameter of the request message.

If processing by the deleting request is successful, the receiver 310 may configure a value (for example, 2002) of the response state code indicating the success, inserts the value into the response message, and transmit the response message.

Figure 9:
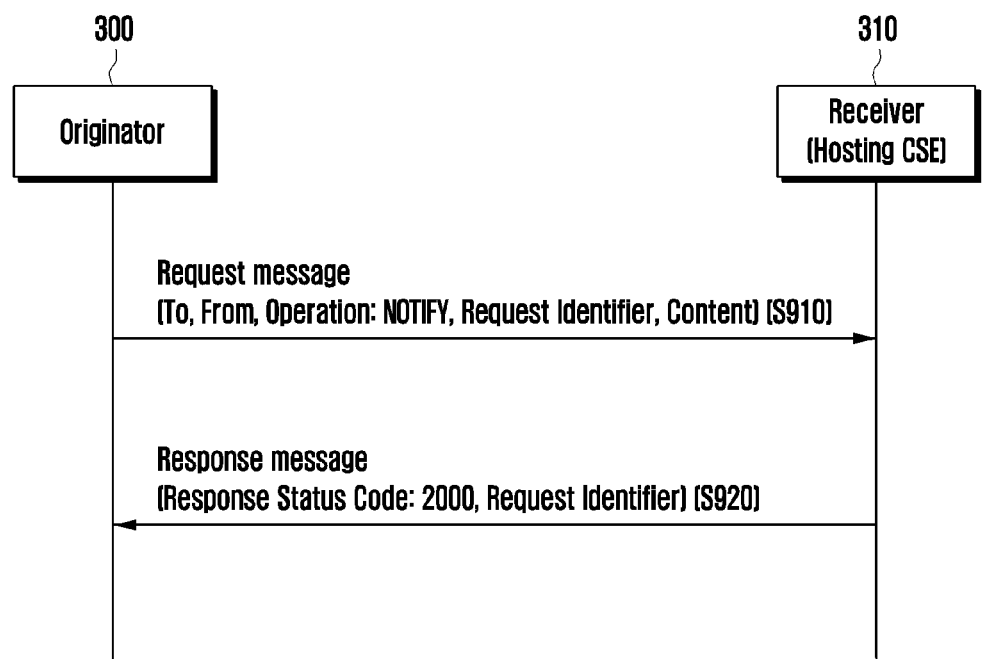

Referring to FIG. 9, the originator 300 may transmit a request message for making a request for notifying resources by the blocking (blockingRequest) mode in S910. For example, the request message may necessarily include the above-described operation parameter, receiving side parameter, transmitting side parameter, and request identification parameter and further include notified content information. The operation parameter is configured as a value indicating notifying (or notification).

Upon receiving the request message, the receiver 310 receives notification content according to the requested operation parameter and transmits a response message including a response state code parameter indicating whether the notification content is normally received or indicating the result of normal processing for the corresponding notified resources (for example, resource creation) to the originator 300 in S920. The request identification parameter of the request message may be configured as a value which is the same as the request identification parameter of the request message.

If the notification request message is normally received or resources are normally created, the receiver 310 may configure a value (for example, 2000) of the response state code indicating the normal reception or normal creation, insert the value into a response message, and transmit the response message.

As described above, if there is no response type parameter in the request message or the response type parameter value is configured as a value indicating the blocking mode, the receiver may transmit a response message including a response state code for the corresponding operation to the originator, so that the originator may clearly recognize whether the corresponding operation is normally performed.

Meanwhile, the response type parameter may be configured as not only the blocking mode but also a synchronous non-blocking mode, asynchronous non-blocking mode, or a flex blocking mode. Hereinafter, a method of processing a request message in the case in which the response type parameter is configured as a mode other than the blocking mode will be described.

Figure 10:
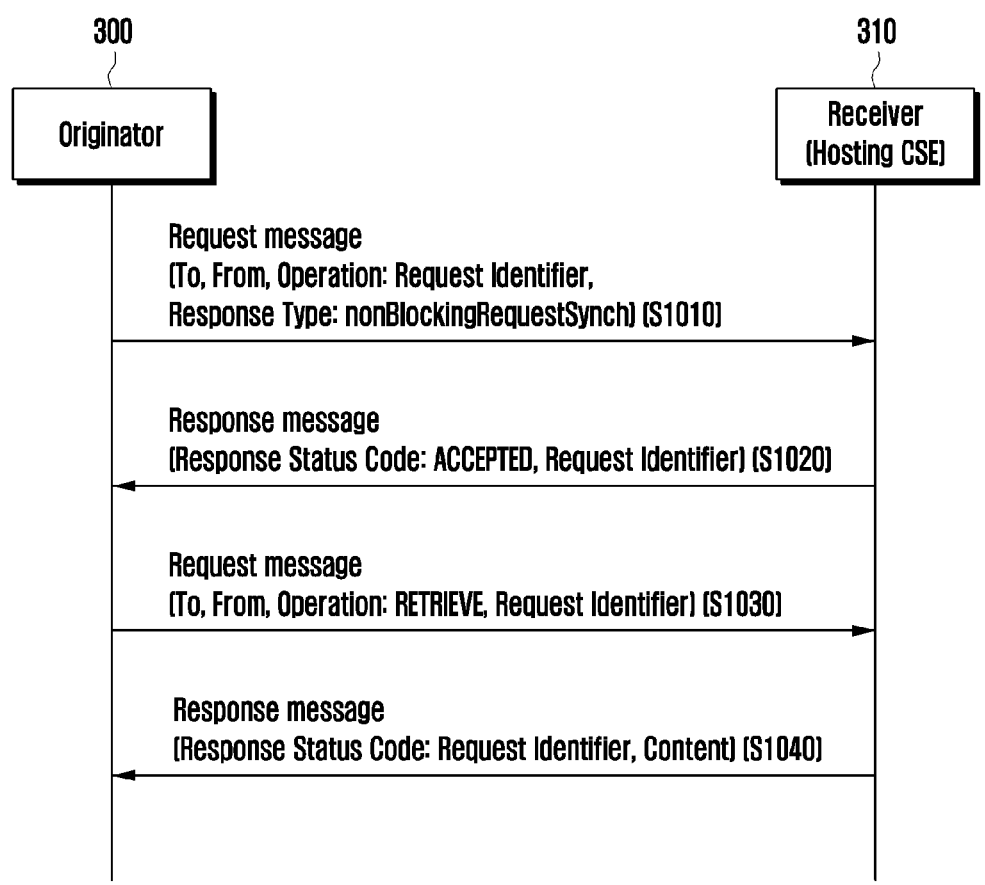
FIG. 10 illustrates a method of processing a request message in the case in which the response type parameter of the request message is configured as a synchronous blocking mode according to an embodiment.

FIG. 10 illustrates a method of processing a request message in the case in which a response type parameter of the request message is configured as a synchronous non-blocking mode according to an embodiment.

Referring to FIG. 10, the originator 300 may transmit a request message including a necessary parameter and a response type parameter to the receiver 310 in S1010. In this case, the response type parameter included in the request message may be configured as a synchronous non-blocking mode. That is, the response type parameter may be configured as a value indicating the synchronous non-blocking mode (nonBlockingRequestSynch).

The synchronous non-blocking mode is a mode for allowing the originator 300 to perform another task after transmitting a request message, in which the originator 300 may process multi-tasking through a time-division scheme until a time point at which the receiver 310 completes processing. That is, the synchronous non-blocking scheme corresponds to a method by which the originator 300 transmits a request message and the receiver 310 processes the corresponding request message, and then the originator 300 identifies a processing result through a separate request message in the future.

Specifically, the receiver 310 receiving the request message in S1010 transmits a response message including a response state code indicating whether the corresponding request message is normally received to the originator 300 in S1020. A request identification parameter included in the response message transmitted in step S1020 is configured to be the same as the request identification parameter value of step S1010. The response state code included in the response message of step S1020 refers to information indicating whether the receiver 310 normally receives the request message of step S1010 and is configured as a value indicating "Accepted". If the receiver 310 does not normally receive the request message of step S1010, the receiver 310 transmits a response message including a response state code indicating "Error" or does not transmit the message of step S1020.

Accordingly, the originator 300 may identify whether the request message normally reaches the receiver 310 and will be processed thereby.

Thereafter, the originator 300 transmits a request message for retrieving a result of the processing operation requested in step S1010 after a predetermined time interval in S1030. Since the request message of step S1030 is for retrieving, the operation parameter may be configured as a value indicating retrieving. The request identification parameter of step S1030 may be configured to be the same as that in S1010 or S1020 or different therefrom.

Upon receiving the request message of step S1030, the receiver 310 may transmit a response message including content information retrieved through the corresponding retrieving operation and the response state code to the originator 300 in S1040.

The operation for processing the response to the request from the originator 300 through such a series of operations is the synchronous non-blocking mode.

Figure 11:
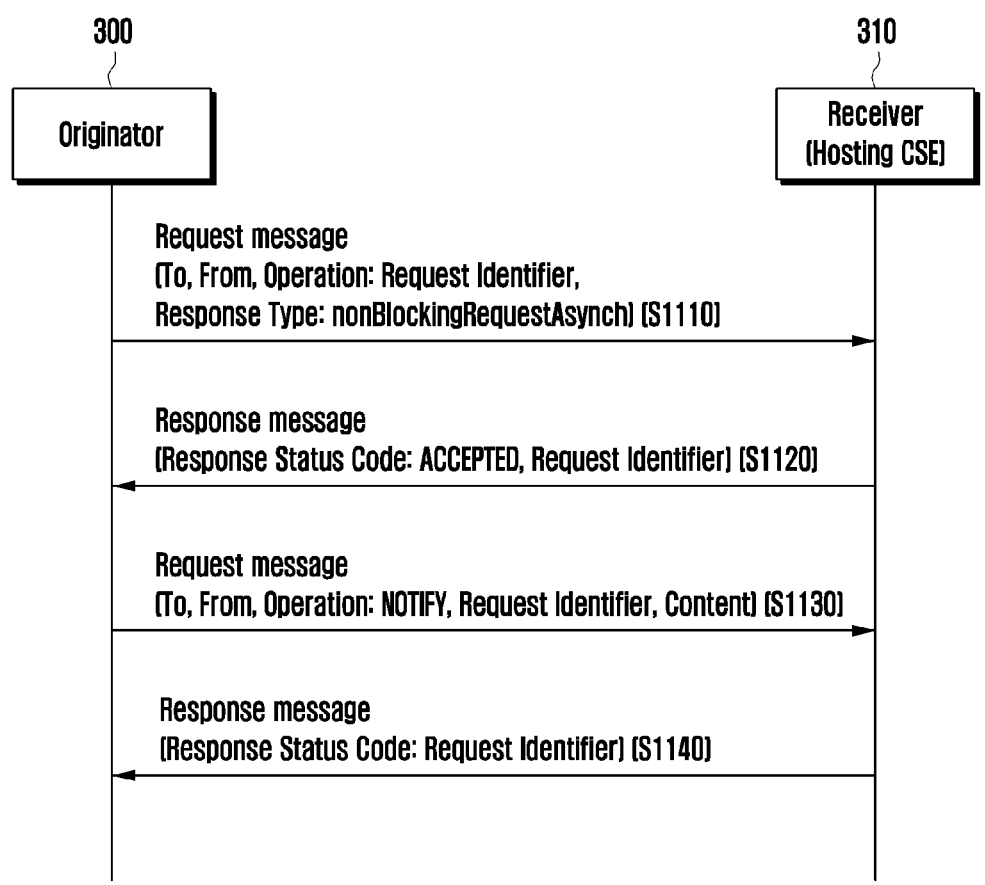
FIG. 11 illustrates a method of processing a request message in the case in which the response type parameter of the request message is configured as an asynchronous non-blocking mode according to an embodiment.

FIG. 11 illustrates a method of processing a request message in the case in which a response type parameter of the request message is configured as an asynchronous non-blocking mode according to an embodiment.

Referring to FIG. 11, the originator 300 may transmit a request message including a necessary parameter and a response type parameter to the receiver 310 in S1110. In this case, the response type parameter included in the request message may be configured as an asynchronous non-blocking mode. That is, the response type parameter may be configured as a value indicating the asynchronous non-blocking mode (nonBlockingRequestAsynch).

The asynchronous non-blocking mode is also a mode for allowing the originator 300 to perform another task after transmitting a request message in which the originator 300 may process multi-tasking in a time-division scheme until the receiver 310 completes processing. However, unlike the synchronous non-blocking mode in which the originator 300 directly retrieves the processing result after transmitting the request message, the asynchronous non-blocking mode is a scheme in which the receiver 310 directly notifies the originator 300 of a processing result of the corresponding request message.

Specifically, the receiver 310 receiving the request message of step S1110 transmits a response message including a response state code indicating whether the corresponding request message is normally received to the originator 300 in S1120. A request identification parameter included in the response message transmitted in step S1120 is configured to be the same as the request identification parameter value of step S1110. The response state code included in the response message of step S1120 refers to information indicating whether the receiver 310 normally receives the request message of step S1110 and is configured as a value indicating "Accepted". If the receiver 310 does not normally receive the request message of step S1110, the receiver 310 transmits a response message including a response state code indicating "Error" or does not transmit the message of step S1120. That is, the response state code of step S1120 and the response state code of step S1020 are configured as the same value.

Accordingly, the originator 300 may identify whether the request message normally reaches the receiver 310 and will be processed thereby.

Thereafter, the receiver 310 performs a request operation according to the request message of step S1110 and, if processing by the request operation is completed, transmits a notification message for informing the originator 300 of completion of the corresponding request processing operation and processing result content in S1130.

Since the request message of step S1130 is to notify of the processing operation, the operation parameter may be configured as a value indicating notifying. The request identification parameter of step S1130 may be configured to be the same as that in S1110 or S1120 or different therefrom.

If the request message indicating notification of step S1130 is normally received, the originator 300 transmits a response message including a response state code indicating normal reception thereof to the receiver 310 in S1140. Here, the response state code is configured as a value indicating normal reception of the request message of step S1130 and may have the same value as the response state code included in the response message of step S1120. Meanwhile, the request identification parameter of step S1140 is configured to be the same as that of step S1130.

Upon receiving the request message of step S1030, the receiver 310 may transmit a response message including content information retrieved through the corresponding retrieving operation and the response state code to the originator 300 in S1040.

The operation for processing the response to the request from the originator 300 through such a series of operations is the asynchronous non-blocking mode.

As illustrated in FIGS. 10 and 11, if the originator inserts the response type parameter into the request message but the response type parameter is configured as synchronous non-blocking (nonBlockingRequestSynch) or asynchronous non-blocking (nonBlockingRequestAsynch), the receiver transmits a response message including information indicating "Accepted" through the same response state code without distinguishing synchronous non-blocking (nonBlockingRequestSynch) and asynchronous non-blocking (nonBlockingRequestAsynch). This is possible because the originator and the receiver recognize which response mode is used to process the corresponding request message through the response type parameter.

However, the operation may have a problem if the originator configures the response type parameter in the request message as a flex blocking (flexBlocking) mode that is a receiver-customized mode. That is, the originator cannot know which response mode is selected by the receiver to process the corresponding request message. Accordingly, there may be ambiguity in future progress of the processing operation, and the ambiguity may cause the overall operation of the M2M system to have a problem.

Figure 12:
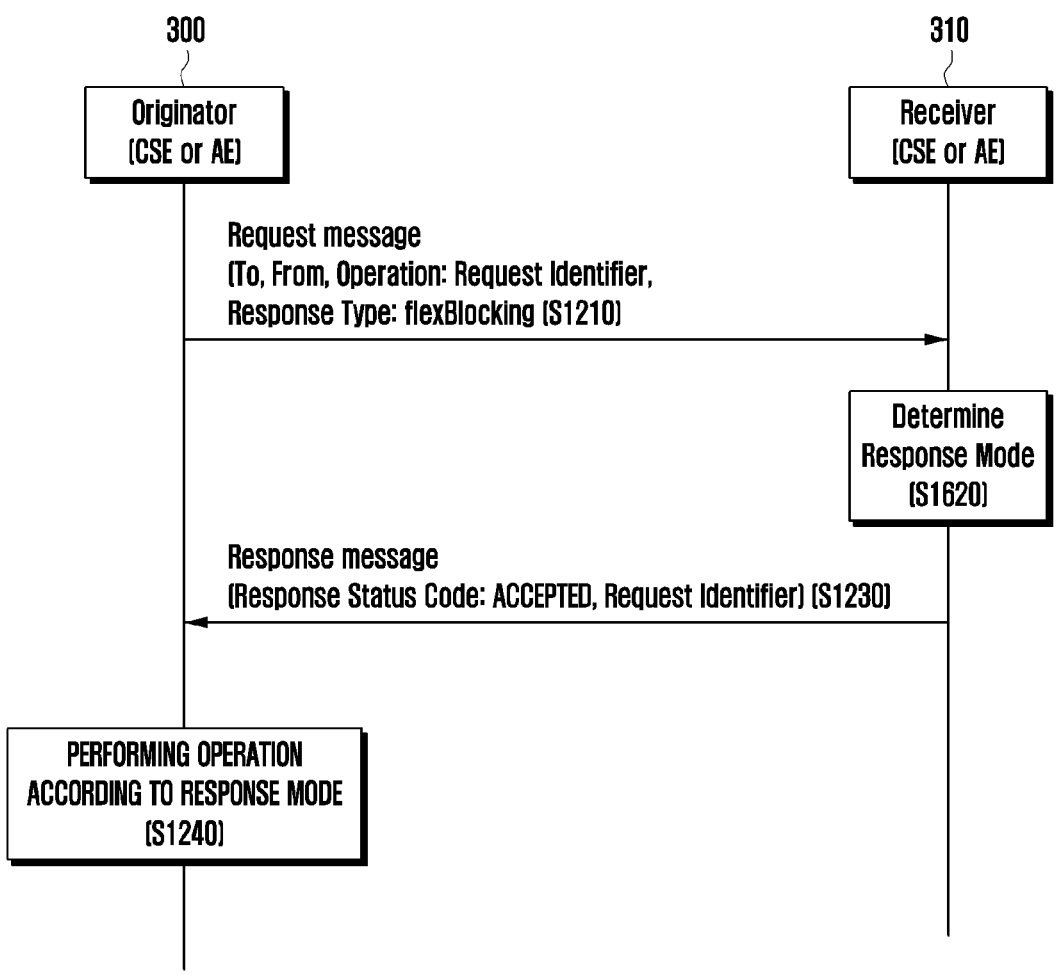
FIG. 12 illustrates a problem occurring when a request message is processed in the case in which the response type parameter of the request message is configured as a flex blocking mode according to an embodiment.

FIG. 12 illustrates a problem occurring when a request message is processed in the case in which a response type parameter of a request message is configured as a flex blocking mode according to an embodiment.

Referring to FIG. 12, the originator 300 may transmit a request message including a necessary parameter and a response type parameter to the receiver 310 in S1210. In this case, the response type parameter included in the request message may be configured as a flex blocking mode. That is, the response type parameter may be configured as a value indicating the flex blocking (flexBlocking) mode.

In the flex blocking mode, the corresponding request message is processed in one mode selected from the blocking mode, the synchronous non-blocking mode, and the asynchronous non-blocking mode, and the corresponding selection operation is performed by the receiver 310 according to a preset function and policy. Accordingly, the originator 300 cannot know which response mode is determined by the receiver 310.

Specifically, upon receiving the request message, the receiver 310 identifies the response type parameter and, if the response type parameter is configured as flex blocking, determines a response mode for processing the corresponding request message with reference to a policy of the receiver 310 in S1220.

The receiver 310 transmits a response message indicating whether the request message of step S1210 is normally received to the originator 300 in S1230. In this case, the response state code included in the response message of step S1230 is designated as the same value as the response state code indicating normal reception of the request message in FIGS. 10 and 11. That is, the response state code is configured as a value indicating "Accepted". The request identification parameter of step S1210 and the request identification parameter of step S1230 are configured as the same value. Meanwhile, step S1230 may be performed before step S1220. That is, since there is parameter for informing of the response mode in the response message of step S1230, the response message may be transmitted before step S1220.

The originator 300 may identify whether the request message of step S1210 is normally transmitted by receiving the response message of step S1230 in S1240. However, the originator 300 cannot recognize which response mode is used by the receiver 310 to process the corresponding request message. For example, the originator 300 cannot know whether the originator 300 should transmit an additional retrieving request message as illustrated in FIG. 10 since the corresponding request message is processed through the synchronous non-blocking mode or wait to receive a notification request message as illustrated in FIG. 11 since the corresponding request message is processed through the asynchronous non-blocking mode. That is, the originator 300 is required to perform the operation according to the determined response mode, but has ambiguity in performing the operation.

In order to solve the problem, the embodiment proposes a method of, when the originator indicates flex blocking (flexBlocking) as the response type parameter value, configuring response state code information through which the originator is able to know a processing result of the receiver according to a response mode determined by the receiver. Further, the embodiment proposes a method of transmitting corresponding response mode information without any increase in load of the whole M2M system.

Figure 13:
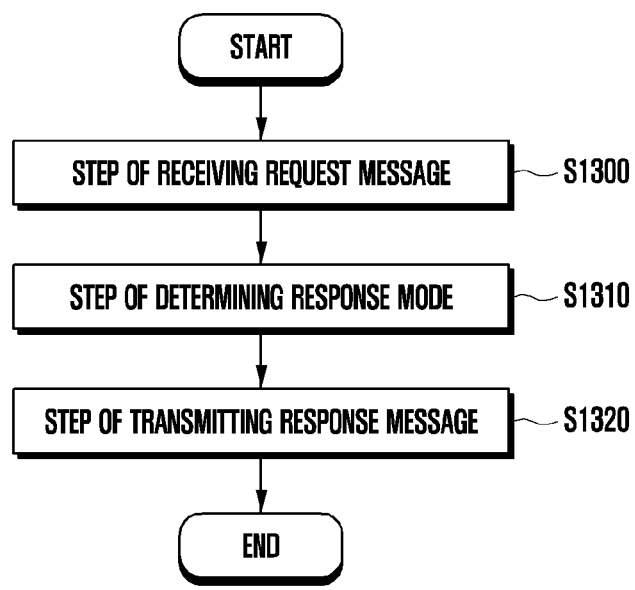
FIG. 13 illustrates an operation in which an M2M device processes a request message according to an embodiment.

FIG. 13 illustrates an operation in which an M2M device processes a request message according to an embodiment.

Referring to FIG. 13, a machine to machine communication (M2M) device performs a step of receiving a request message including response type parameter information from another M2M device to process the request message in S1300.

For example, the request message may include an operation parameter, a receiving side parameter, a transmitting side parameter, and a request identification parameter. The parameters are the above-described necessary parameters, and may further include content information and resource type information according to the type of the operation parameter.

As described above, in the case in which the response type parameter exists or does not exist, the response type parameter may be configured as information indicating one of the blocking mode, the synchronous non-blocking mode, the asynchronous non-blocking mode, and the flex blocking mode.

The M2M device performs a step of identifying response type parameter information and determining a response mode according to the response type parameter information in S1310. For example, if the response type parameter is not included in the request message or is configured as a value indicating the blocking mode, the M2M device determines the response mode as the blocking mode. On the other hand, if the response type parameter is configured as a value indicating the synchronous non-blocking mode or a value indicating the asynchronous non-blocking mode, the M2M device determines the response mode as the synchronous non-blocking mode or the asynchronous non-blocking mode.

Meanwhile, if the response type parameter is configured as a value indicating flex blocking, the M2M device determines the response mode in consideration of the overall environment of the M2M device such as a policy, a function, limit, and whether notification target information is included in the request message.

For example, if the response type parameter is configured as a value indicating flex blocking, the M2M device may identify whether there is notification target information in the request message and determine the response mode according thereto.

For example, if the notification target information is included in the request message, the M2M device may determine one of the blocking mode, the synchronous non-blocking mode, and the asynchronous non-blocking mode as the response mode.

In another example, if the notification target information is not included in the request message, the M2M device may determine one of the blocking mode and the synchronous non-blocking mode as the response mode.

The M2M device performs a step of transmitting a response message including a response state code configured depending on the determined response mode in S1320. For example, the M2M device transmits a response state code indicating whether the request message is normally received to the originator. However, in order to prevent the problem in FIG. 12, the response state code may be configured to be different depending on the response mode determined in step S1310.

For example, referring to FIG. 14, the response state code may be configured such that the blocking mode, the synchronous non-blocking mode, and the asynchronous non-blocking mode have different values according to the determined response mode.

For example, if the M2M device determines the blocking mode as the response mode, the response state code may be configured as 1000 and included in the response message.

In another example, if the M2M device determines the synchronous non-blocking mode as the response mode, the response state code may be configured as 1001 and included in the response message.

In another example, if the M2M device determines the asynchronous non-blocking mode as the response mode, the response state code may be configured as 1002 and included in the response message.

Accordingly, through the method, the originator can identify the response mode determined by the M2M device by receiving the response message, thereby preventing ambiguity in the later operation. Further, by using a method of distinguishing the conventional response state codes rather than a separate parameter, it is possible to prevent signal load of the whole system from increasing.

Meanwhile, the response message may include a request identification parameter configured as the same value as the identifier included in the request identification parameter of the request message.

Hereinafter, the method by which the M2M device determines the response mode will be described once more with reference to the drawings.

Figure 15:
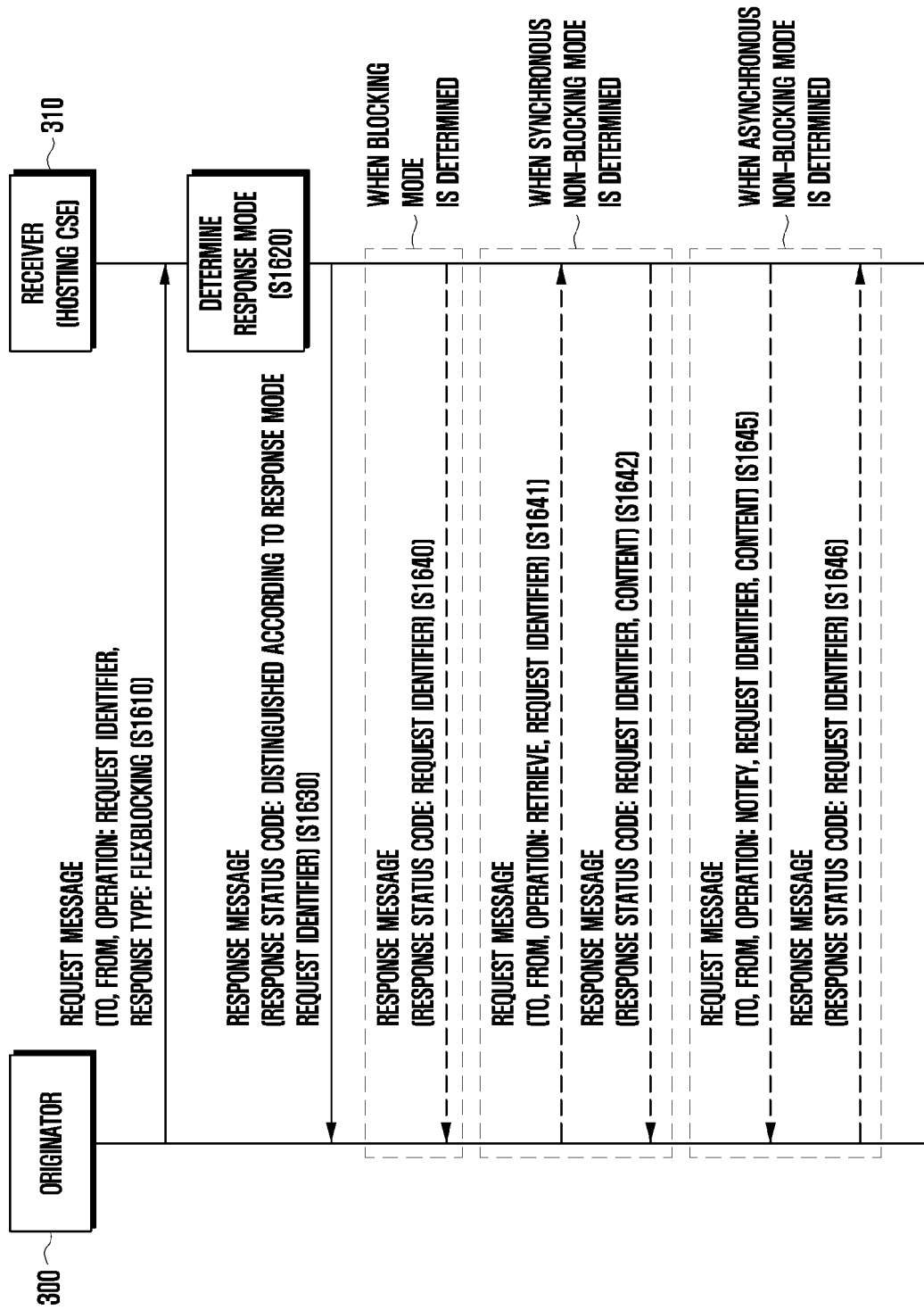
FIG. 15 illustrates an operation in which an M2M device determines a response mode according to an embodiment.

FIG. 15 illustrates an operation in which the M2M device determines a response mode according to an embodiment.

Referring to FIG. 15, the M2M device may receive a request message and identify a response type parameter in S1500. As described above, the response type parameter may not exist or may include information indicating one of blocking, synchronous non-blocking, asynchronous non-blocking, and flex blocking.

If the response type parameter is configured as a value indicating flex blocking, the M2M device determines whether notification (notifying) target information exists in the request message in S1510. If the notification target information is included in the request message, the M2M device performs a response mode determination operation based on a notification policy in S1520. For example, a priority of the notification policy-based response mode determination or an algorithm of the notification policy-based response mode determination may be configured in advance in the M2M device, and the M2M device may select a response mode on the basis of the corresponding priority or algorithm.

For example, the M2M device may determine the asynchronous non-blocking mode as the response mode and perform a request message processing operation according to the corresponding procedure in S1530.

In another example, the M2M device may determine the synchronous non-blocking mode as the response mode and perform a request message processing operation according to the corresponding procedure in S1540.

In another example, the M2M device may determine the blocking mode as the response mode and perform a request message processing operation according to the corresponding procedure in S1550.

On the other hand, the M2M device may determine that the notification target information does not exist in S1510. In this case, the M2M device may perform a response mode determination operation based on a non-notification policy in S1525. A non-notification policy-based response mode determination algorithm may be configured to determine one of the blocking mode and the synchronous non-blocking mode as the response mode. That is, in the non-notification policy-based response mode determination, the asynchronous non-blocking mode cannot be selected.

For example, the M2M device may determine the synchronous non-blocking mode as the response mode and perform a request message processing operation according to the corresponding procedure in S1540.

In another example, the M2M device may determine the blocking mode as the response mode and perform a request message processing operation according to the corresponding procedure in S1550.

The M2M device may determine a response state code shown in FIG. 14 according to the response mode determined through the procedure, insert the response state code into a response message, and transmit the response message to the originator.

For example, if a blocking mode is determined as the response mode, the M2M device may determine one response state code selected from those illustrated in FIGS. 5 to 9 according to the operation parameter of the request message and process the response message through the corresponding procedure.

In another example, if it is determined to process the request message according to the synchronous non-blocking (nonBlockingRequestSynch) scheme, the M2M device transmits a response message including a response state code preset according to the corresponding response mode.

In another example, if it is determined to process the message according to the asynchronous non-blocking (nonBlockingRequestAsynch) scheme, the M2M device may transmit response message including a response state code mapped to the asynchronous non-blocking mode.

In addition, the M2M device may allocate the response state code according to the synchronous non-blocking (nonBlockingRequestSynch) scheme and the asynchronous non-blocking (nonBlockingRequestAsynch) scheme and transmit the response message.

The originator may identify the response state code of the response message, recognize the response mode selected by the M2M device, and perform the following procedure.

Figure 16:
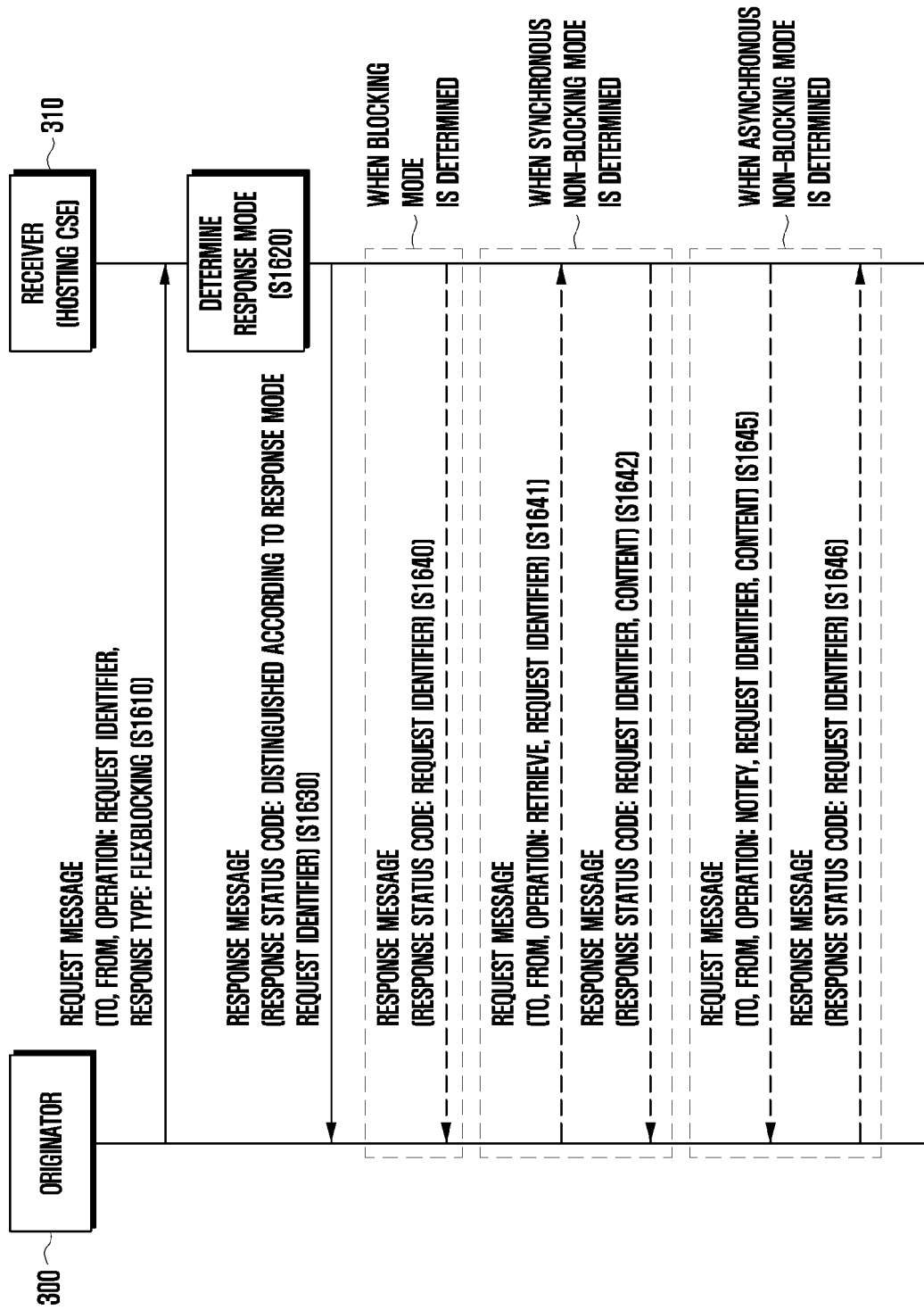
FIG. 16 illustrates a procedure of processing a request message for each response mode based on response mode determination according to an embodiment.

FIG. 16 illustrates a request message processing procedure for each response mode based on response mode determination according to an embodiment.

Referring to FIG. 16, the receiver 310 may receive a request message from the originator 300. As described above, the request message may include the necessary parameter and the selective parameter. The response type parameter included in the request message may be configured as a value indicating flex blocking in S1610.

The receiver 310 may determine a response mode on the basis of whether there is a policy or notification target information in S1620. Thereafter, the receiver 310 transmits a response message including a set response state code mapping to the determined response mode to the originator 300 in S1630.

More specifically, the following procedure may be different depending on the response mode.

For example, if the receiver 310 determines the blocking mode as the response mode, various messages may be transmitted according to the operation parameter of the request message. For example, after step S1630, a response message including information on the processing result of the corresponding request message may be transmitted in S1640.

In another example, if the receiver 310 determines the synchronous non-blocking mode, the receiver 310 processes the request message after step S1630, and the originator 300 recognizes the corresponding response mode through the response message of step S1630, and transmits a retrieving request message for retrieving the processing result of the request message in S1641. The receiver 310 transmits a response message including the request processing result information to the originator 300 in response to the request message of step S1641 in S1642.

In another example, if the receiver 310 determines the asynchronous non-blocking mode, the receiver 310 processes the request message after step S1630, and the originator 300 recognizes the corresponding response mode through the response message of step S1630 and waits for the request message of step S1645 from the receiver 310. If the processing result of the request message is generated, the receiver 310 transmits a notification request message indicating the processing result to the originator 320 in S1645. The originator 300 transmits a response message including a response state code indicating whether the request message of step S1645 is normally received to the receiver 310 in S1646.

Through the operation, the originator can perform the operation according to the corresponding response mode without any ambiguity even though the response type parameter is configured as flex blocking. Hereinafter, a configuration of an M2M device capable of implementing all of the embodiments described with reference to FIGS. 1 to 16 will be described once more with reference to the drawings.

Figure 17:
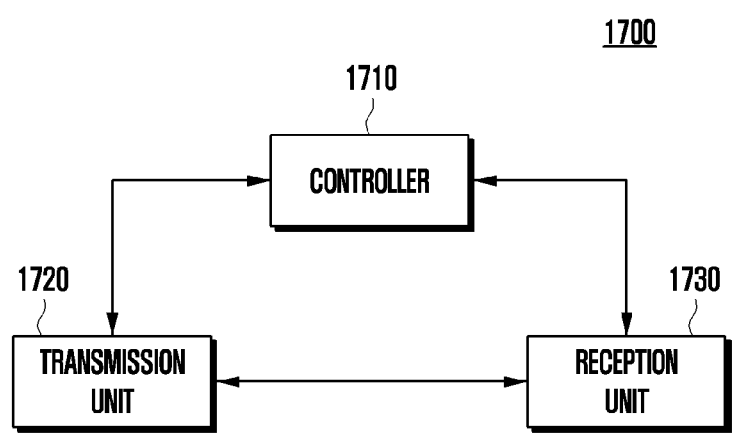
FIG. 17 illustrates a structure of an M2M device according to an embodiment.

FIG. 17 illustrates a structure of an M2M device according to an embodiment.

Referring to FIG. 17, a machine to machine communication (M2M) device 1700 may include a reception unit 1730 configured to receive a request message including response type parameter information from another M2M device, a controller 1710 configured to identify the response type parameter information and determine a response mode according to the response type parameter information, and a transmission unit 1720 configured to transmit a response message including a response state code configured depending on the determined response mode.

For example, the request message may include an operation parameter, a receiving side parameter, a transmitting side parameter, and a request identification parameter. The parameters are the above-described necessary parameters and may further include content information and resource type information according to the type of the operation parameter. As described above, in the case in which the response type parameter exists or does not exist, the response type parameter may be configured as information indicating one of the blocking mode, the synchronous non-blocking mode, the asynchronous non-blocking mode, and the flex blocking mode.

If the response type parameter is not included in the request message or is configured as a value indicating the blocking mode, the controller 1710 determines the blocking mode as the response mode. On the other hand, if the response type parameter is configured as a value indicating the synchronous non-blocking mode or as a value indicating the asynchronous non-blocking mode, the controller 1710 determines the synchronous non-blocking mode or the asynchronous non-blocking mode as the response mode.

Meanwhile, if the response type parameter is configured as a value indicating flex blocking, the controller 1710 determines the response mode in consideration of the overall environment of the M2M device 1700 such as a policy, a function, limit, and whether notification target information is included in the request message.

For example, if the response type parameter is configured as a value indicating flex blocking, the controller 1710 may identify whether there is notification target information in the request message and determine the response mode according thereto.

For example, if the notification target information is included in the request message, the controller 1710 may determine one of the blocking mode, the synchronous non-blocking mode, and the asynchronous non-blocking mode as the response mode.

In another example, if the notification target information is not included in the request message, the controller 1710 may determine one of the blocking mode and the synchronous non-blocking mode as the response mode.

Meanwhile, the transmitter 1720 transmits a response state code indicating whether the request message is normally received to the originator. The response state code may be configured as a value according to the determined response mode.

For example, if the controller 1710 determines the blocking mode as the response mode, the response state code may be configured as 1000 and included in the response message.

In another example, if the controller 1710 determines the synchronous non-blocking mode as the response mode, the response state code may be configured as 1001 and included in the response message.

In another example, if the controller 1710 determines the asynchronous non-blocking mode as the response mode, the response state code may be configured as 1002 and included in the response message.

In addition, the controller 1710 determines the response mode when the response type parameter according to the embodiment is configured as flex blocking and controls the overall operation of the M2M device 1700 according to determination of the response state code depending on the response mode.

Further, the transmission unit 1720 and the reception unit 1730 may be used to transmit and receive message, signals, and data required for implementing the embodiment to and from at least one of the originator, another M2M device, another node included in the M2M system, and a user terminal.

The terms, "system", "processor", "controller", "component", "module", "interface", "model", and "unit" in the specification may generally refer to computer-related entity hardware, a combination of hardware and software, software, or software being executed. For example, the above-described elements may be a process executed by a processor, a processor, a controller, a control processor, an entity, an executed thread, a program, and/or a computer, but are not limited thereto. For example, all of an application executed by a controller or a processor, the controller, or the processor may be elements. One or more elements may be within a process and/or an executed thread, and may be located in one system or distributed to two or more systems.

The standard details or standard documents mentioned in the above embodiments are omitted for the simplicity of the description of the specification, and constitute a part of the specification. Therefore, when a part of the contents of the standard details and the standard documents is added to the specifications or is disclosed in the claims, it should be construed as falling within the scope of the disclosure.

Although a preferred embodiment of the disclosure has been described for illustrative purposes, those skilled in the art will appreciate that various modifications, additions and substitutions are possible, without departing from the scope and spirit of the disclosure as disclosed in the accompanying claims. Therefore, exemplary aspects of the disclosure have not been described for limiting purposes. The scope of the disclosure shall be construed on the basis of the accompanying claims in such a manner that all of the technical ideas included within the scope equivalent to the claims belong to the disclosure.

The invention claimed is:

1. A method of processing a request message by a machine-to-machine communication (M2M) device, the method comprising:
  receiving a request message including response type parameter information from another M2M device;
  identifying the response type parameter information and determining a response mode according to the response type parameter information; and
  transmitting a response message including a response state code configured according to the determined response mode,
  wherein the response state code is configured such that a blocking mode, a synchronous non-blocking mode, and an asynchronous non-blocking mode have different values according to the determined response mode.

2. The method of claim 1, wherein the request message further comprises an operation parameter, a receiving side parameter, a transmitting side parameter, and a request identification parameter, and the response message includes an identifier identical to an identifier included in the request identification parameter.

3. The method of claim 1, wherein the response mode is determined as one of the blocking mode, the synchronous non-blocking mode, and the asynchronous non-blocking mode.

4. The method of claim 1,
  wherein the response type parameter information includes information indicating flex blocking, and
  wherein the determining of the response mode comprises determining the response mode by further identifying whether notification target information is included in the request message.

5. The method of claim 4, wherein, in case that the notification target information is included in the request message, the determining of the response mode comprises determining the response mode as one of the blocking mode, the synchronous non-blocking mode, and the asynchronous non-blocking mode.

6. The method of claim 4, wherein, in case that the notification target information is not included in the request message, the determining of the response mode comprises determining the response mode as one of the blocking mode and the synchronous non-blocking mode.

7. A machine-to-machine communication (M2M) device for processing a request message, the M2M device comprising:
  a transceiver; and
  a controller connected to the transceiver, the controller being configured to:
  receive a request message including response type parameter information from another M2M device;
  identify the response type parameter information and determine a response mode according to the response type parameter information; and
  transmit a response message including a response state code configured according to the determined response mode,
  wherein the response state code is configured such that a blocking mode, a synchronous non-blocking mode, and an asynchronous non-blocking mode have different values according to the determined response mode.

8. The M2M device of claim 7, wherein the request message further comprises an operation parameter, a receiving side parameter, a transmitting side parameter, and a request identification parameter, and the response message includes an identifier identical to an identifier included in the request identification parameter.

9. The M2M device of claim 7, wherein the response mode is determined as one of the blocking mode, the synchronous non-blocking mode, and the asynchronous non-blocking mode.

10. The M2M device of claim 7,
  wherein the response type parameter information includes information indicating flex blocking, and
  wherein the controller determines the response mode by further identifying whether notification target information is included in the request message.

11. The M2M device of claim 10, wherein, in case that the notification target information is included in the request message, the controller determines the response mode as one of the blocking mode, the synchronous non-blocking mode, and the asynchronous non-blocking mode.

12. The M2M device of claim 10, wherein, in case that the notification target information is not included in the request message, the controller determines the response mode as one of the blocking mode and the synchronous non-blocking mode.

* * * * *